(No Model.)
M. E. BLOOD.
SEAT ATTACHMENT FOR BICYCLES.
No. 480,760. Patented Aug. 16, 1892.
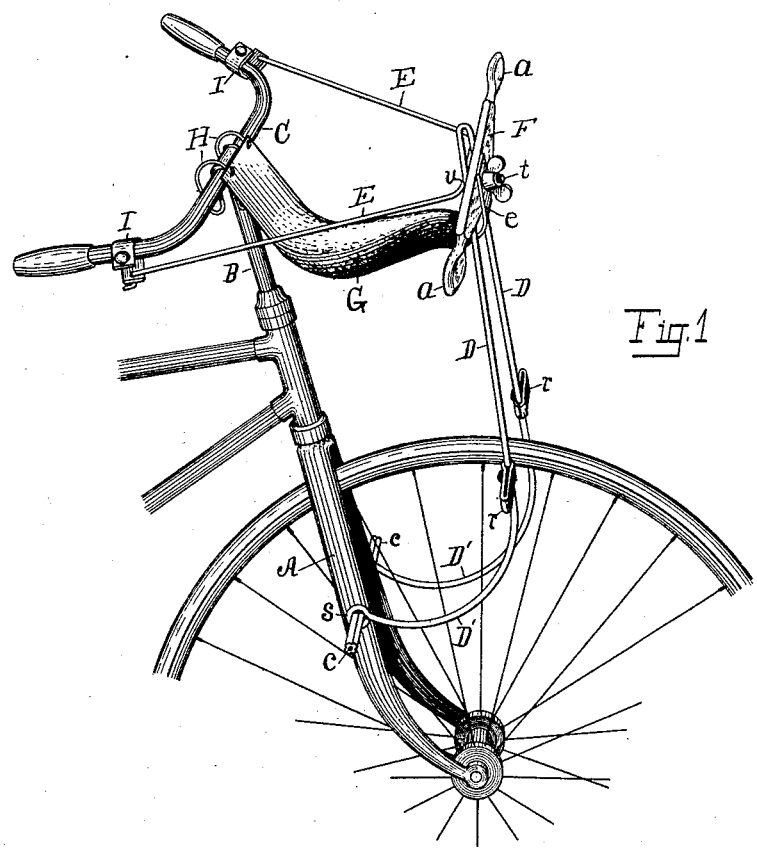
Fig. 1
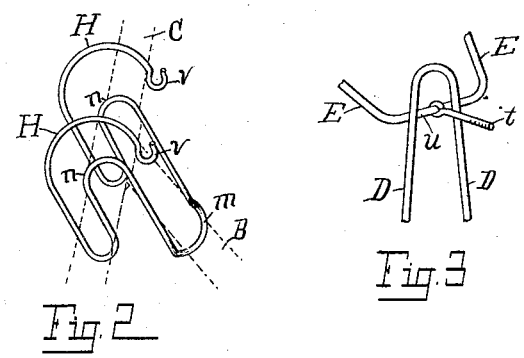
Fig. 2
Fig. 3
Witnesses:
Walter S. Wood
Dorr E. Wood
Inventor.
Maurice E. Blood

UNITED STATES PATENT OFFICE.

MAURICE E. BLOOD, OF KALAMAZOO, MICHIGAN, ASSIGNOR TO THE KALAMAZOO CYCLE COMPANY, OF SAME PLACE.

SEAT ATTACHMENT FOR BICYCLES.

SPECIFICATION forming part of Letters Patent No. 480,760, dated August 16, 1892.

Application filed November 2, 1891. Serial No. 410,568. (No model.)

*To all whom it may concern:*

Be it known that I, MAURICE E. BLOOD, residing at Kalamazoo, in the county of Kalamazoo and State of Michigan, have invented a new and useful Improvement in Seat Attachments for Bicycles, of which the following is a specification.

The object of this invention is to provide a seat attachment whereby a second person can ride on a bicycle over the forward wheel and in front of the regular handle-bar of the bicycle and to so arrange the several parts that they can be adjusted to fit persons of nearly any age, from a baby to a grown person, but more particularly adapted to youths from three to twelve or fourteen years of age, and to make the device light and simple in construction and so it shall be safe and easy to ride on and easy to attach to or detach from the bicycle. I attain these objects by the devices illustrated in the accompanying drawings, in which—

Figure 1 is a perspective view showing the devices attached to the forward part of a bicycle. Fig. 2 is an enlarged detail, being a perspective view of the connecting-spring and hook to the handle-bar, the dotted lines being the outlines of a portion of the handle-bar; and Fig. 3 is an enlarged detail, being the forward end or part of the handle-bar braces with the eyebolt and the upper end of the supplementary seat support and the relation of these parts to each other.

A whole bicycle is not shown in the drawings, only enough—viz., the handle-bar, steering head and fork, and upper part of the front wheel to which the devices of this invention are attached—to show their relation to the bicycle.
Similar letters refer to similar parts throughout the several views.

The fork of the bicycle is designated by the letter A, the post by B, and the handle-bar by C.
D D is the support for the forward end of the seat or saddle G. It also has the foot-rests $r\,r$ and the front handle-bar F attached to it to come in the proper positions for the hands and feet of the person riding on this device. This front support D D is preferably made of spring wire or rod or of material that will give elasticity between its upper and lower connections to the seat and fork of the bicycle, and it is made with hooks or eyes on its lower end to go over or rest on the coasters $c\,c$ of the bicycle, but could be made to rest on some other part of the fork A. From these rests on the coasters $c\,c$ the rods D D, where they come on each side of the front wheel of the bicycle, should project forward and be bowed or curved to run upward in the proper place to have the foot-rests $r\,r$ attached to them and to extend upward to meet at the front end of the seat G and form the front support for said seat. By being made in this form and of spring metal the lower ends can be sprung apart to go on the coasters $c\,c$ and it will make an elastic support for the forward end of the seat G and also for the foot-rests $r\,r$ and the handles $a\,a$. By making the support D D as above described I have substantially a second front fork post and handle-bar; but this second front-fork is made to bow forward or take a reverse curve to what the regular bicycle-forks usually have. It has to do this to come in the proper position for the foot-rests $r\,r$.

E E are for guards and side braces. Their rear ends are connected to the bicycle handle-bar near the handles on each side in such a manner that there cannot be end-play to the said guards or braces. From these points the guards or braces E E run horizontally, or nearly so, forward and approach each other at their forward ends or are joined together at their front ends by the part $u$, where they connect with the front support or fork D D. I prefer to make these braces and the part $u$ all of one piece, which can be a wire or rod bent as shown in the drawings. The functions of these guards or braces E E are not for supporting the seat G in any manner, but they are for steadying the support or fork D D to keep it from moving sidewise or backward, and they are also used for guards to go around the sides and front of the rider to secure him from falling from the seat. Aside from these uses the braces or guards E E could be dispensed with entirely. The second handle-bar F is made to come across the upper 100 part of the support or fork D D and on the opposite side from the part $u$ of the braces or guards E E, and there is an eyebolt t, which hooks around the part u of the side braces and then passes through the handle-bar F, and a suitable nut on said eyebolt screws up against the handle-bar F to bind the handle-bar and part u of the braces against the support or fork D D, which is between them. The height of said handle-bar F can be regulated by moving the handle-bar up or down on the support or fork D D before tightening the nut on the eyebolt.

The supplementary seat G is made in the form of a saddle suspended from each end, but could be made in any other desired form. The rear end of said seat or saddle is hung on the hooks v v of the wire spring or support H H and the front end e is hung on the eyebolt t between the nut and the handle-bar F. This front part e of the seat or saddle G can be made of metal of a form to have the front end of the saddle united to it and then turn up to where the eyebolt t passes through it. When there is weight on the saddle G, the tendency will be to draw the front support or fork D D backward and against the braces or guards E E. This seat or saddle G can be raised or lowered at its forward end on the support or front fork D D in the same manner as the handle-bar F.

The rear support H for the seat or saddle G is made of a single wire, bent and shaped, as shown in Fig. 2, each side having a double curve or hook to go over the handle-bar C. The inner hook or curve n n is made to hook or rest on the handle-bar C, while the outer curve is made to come higher up, so there will be room for spring movement between the two hooks or curves. The ends of the wire terminate in the upper curve in the hooks v v. The opposite end m of these side wires and hooks is made to rest on the handle-bar post B to prevent the wire from turning on the handle-bar C. All it is necessary to do to attach this support H H to the handle-bar C is to hook it over such handle-bar and have the part m rest on the part B.

The handle-bar clips I I are made of flat metal of horseshoe shape to go around the handle-bar C and are secured rigidly thereto by means of suitable bolts through the ends of the clips to draw them together and bind them on the said handle-bar. One end of each of the said clips can be longer than the other end and have a hole in it suitable to hook the ends of the braces or guards E E in, and the hooks on these braces can be made so they can be hooked onto the clips when the clips are secured to the handle-bar. In this manner the devices herein shown can be removed from the bicycle by pulling the hooks s off the coasters c c and then unhooking the braces E E from the clips I I and lifting the wire H H off the handle-bar C, and the clips I I can be removed or not, as desired.

The foot-rests r r can be made in the usual form to make coasters for a bicycle where they are divided and clamp on the outside of the forks and are held in place by a suitable bolt or screw to bind them together against the sides or wires of the fork. Having the fork-wires D running vertically where these foot-rests are to be used, the said foot-rests can be raised or lowered on said wires to suit the position of the feet.

I am aware that seat attachments have been made before and supported partly from the coasters on the forks of bicycles, and that the support on the coasters has been made of wires and elastic between the coasters and the seat, and I do not claim, broadly, those principles.

What I do claim as new, and desire to secure by Letters Patent, is—

1. In combination with the handle-bar of a bicycle, a second handle-bar F and seat or saddle G, suspended between the two handle-bars and connecting them together, substantially as and for the purposes specified.

2. In combination with the handle-bar of a bicycle, the second handles a a, braces or guards E E, and seat or saddle G, all arranged substantially as and for the purposes specified.

3. In combination with the front fork of a bicycle, a second fork attached thereto, which is bowed or curved at its lower end to make the two said forks together U-shaped and a seat or saddle suspended across the opening of said U-shaped forks, substantially as and for the purposes specified.

4. In combination with the front fork of a bicycle, a second fork attached thereto that is formed of spring metal and bowed down at its lower part, and the upper part of said second fork projecting upward to support on its vertical part the foot-rests r r, seat or saddle G, and handles a a, substantially as and for the purposes set forth.

5. The combination and arrangement of the front fork A, handle-bar C, second fork and support D D, and handles a a, substantially as and for the purposes specified.

6. In combination with a seat or saddle G and the handle-bar C, the wire or spring support H H, having the part m to rest on the handle-bar post, the parts n n, curved to hook over the handle-bar, the side wires then doubling back on themselves to form larger hooks H H, and terminating in the small hooks v v to hang the saddle on, substantially as specified.

7. The seat or saddle G and braces or guards E E, having their forward ends connected to the support D D and the handle-bar F, and secured in place by means of the bolt t, substantially as set forth.

MAURICE E. BLOOD.

Witnesses:
 FANNIE L. PREHN,
 ADDIE E. SCHUMACHER.